United States Patent [19]

Artaud et al.

[11] Patent Number: 4,464,334
[45] Date of Patent: Aug. 7, 1984

[54] FAST NEUTRON NUCLEAR REACTORS

[75] Inventors: Robert Artaud, Aix-en-Provence; Michel Aubert, Manosque; Guy Lemercier, Le Puy Sainte; Paul Lambert, Echirolles; Gilbert Chevallier, Saint Ismier, all of France

[73] Assignee: Commissariat a l'Energie Atomique, France

[21] Appl. No.: 325,762

[22] Filed: Nov. 30, 1981

[30] Foreign Application Priority Data

Dec. 9, 1980 [FR] France ............... 80 26082

[51] Int. Cl.³ ............................................. G21C 11/08
[52] U.S. Cl. ................... 376/298; 376/206; 376/290; 376/460
[58] Field of Search ............... 376/206, 298, 460, 290, 376/287–289

[56] References Cited

U.S. PATENT DOCUMENTS

| | | | |
|---|---|---|---|
| 3,016,462 | 1/1962 | Hendrickson et al. | 376/294 |
| 3,493,758 | 2/1970 | Parker et al. | 376/287 |
| 3,830,695 | 8/1974 | Savvage | 376/298 |
| 4,028,177 | 6/1977 | Failla et al. | 376/290 |
| 4,116,765 | 9/1978 | Marcotte et al. | 376/291 |
| 4,124,447 | 11/1978 | Gross | 376/287 |
| 4,293,383 | 10/1981 | La Kra et al. | 376/290 |
| 4,342,721 | 8/1982 | Pomié et al. | 376/298 |
| 4,367,195 | 7/1983 | Aubert et al. | 376/290 |

FOREIGN PATENT DOCUMENTS

| | | | |
|---|---|---|---|
| 0055643 | 7/1982 | European Pat. Off. | 376/290 |
| 2113672 | 9/1972 | Fed. Rep. of Germany . | |
| 2732741 | 2/1979 | Fed. Rep. of Germany . | |
| 2235460 | 1/1975 | France . | |
| 54-145897 | 11/1979 | Japan | 376/290 |
| 1412764 | 11/1975 | United Kingdom . | |

OTHER PUBLICATIONS

ANL-5719, (5157), p. 148, Koch et al., EBR-11.

*Primary Examiner*—Sal Cangialosi

[57] ABSTRACT

The invention relates to a nuclear reactor cooled by a liquid metal contained in a vessel obturated by upper closing means, said latter essentially being constituted by a slab and rotating plugs. The upper closing means comprise at least one circuit for circulation of a cooling gas or liquid, this circuit being provided with means for maintaining the closing means at a homogeneous temperature at least equal to 100° C. and preferably close to 120° C. The invention is applicable to the production of less cumbersome and less expensive fast neutron nuclear reactors.

11 Claims, 8 Drawing Figures

FAST NEUTRON NUCLEAR REACTORS

The present invention relates to a nuclear reactor cooled by a liquid metal contained in a vessel obturated by upper closing means, said latter essentially being constituted by a slab and rotating plugs.

In nuclear reactors of the fast neutron type, the core of the reactor containing the fuel assemblies is disposed inside a vertical-axis vessel, called main vessel, whose upper part is obturated by a slab bearing one or more rotating plugs of which the combined rotations allow the handling of the fuel in the core by means of appropriate systems such as bars. The slab is generally mounted at the top end of a vessel well and it supports the main vessel as well as means for fine control and for shutdown of the reactor. Moreover, in the reactors of the integrated type, the slab also supports the pumps and heat exchangers which are entirely confined inside the main vessel. The transfer of the calories dissipated by the nuclear fuel placed in the core of the reactor towards the primary heat exchangers is ensured by a liquid metal, generally sodium, which almost entirely fills the main vessel. The liquid sodium is topped by an atmosphere or "layer" of neutral gas, generally argon, separating the free surface of the sodium from the slab and the rotating plugs which constitute the essential elements of the upper closing means of the vessel. As the liquid sodium is condensable the layer of neutral gas is loaded with vapors and aerosols of sodium.

In a reactor of this type, the upper closing means for the main vessel comprise a rigid structure generally made of steel, this structure being filled with concrete serving for biological protection. For different reasons, and particularly to avoid the mechanical stresses resulting from the heterogeneities of temperature existing between the central part of the slab and its periphery, it is necessary to ensure cooling of the upper closing means of the vessel.

To this end, it has been proposed to cool the upper closing means for the vessel to a mean temperature close to 50° C. by circulating a liquid such as water in pipes welded to the structures of the slab and the rotating plugs. However, this solution presents certain drawbacks which lead to a substantial increase in the cost of the reactor. The upper closing elements of the main vessel are thus maintained at a temperature clearly lower than the temperature of fusion of the sodium contained in the tank. It is therefore necessary to protect the lower wall or base of each of these elements by adding thereto a heat insulation constituted by a metallic heat-insulator and a stainless steel screen. The vertical surfaces of the ferrules for passage of the plugs and the other components such as pumps and heat exchangers passing through the upper closing means must also be heat-insulated to avoid the fuel handling runs and the special operations for handling the componets being hindered by the presence of the deposits of solidified sodium in the corresponding annular spaces. The particularly high cost of heat-insulation which must be employed results in an economic handicap for this known solution. Moreover, the dimensions of the insulation and the thermal lining in the annular spaces through which the components pass lead to a substantial increase in the diameter of the slab and consequently that of the vessel. The cost of the reactor is thus doubly penalized. In addition, as a temperature of about 100° C. is required at the level of the upper face of the flanges for supporting the components such as the plugs, pumps or exchangers, in practice enabling any deposit of sodium to be avoided at the corresponding support, the difference between this temperature and the temperature of the upper closing means (about 50° C.) prevents any integration of these flanges in the structure of the slab. This results in a relatively complex configuration of this structure, which further increases the cost of the reactor.

It is an object of the present invention to provide a reactor comprising upper closing means whose level of temperature is fixed so as to solve the problems of stresses connected with differences of temperature between these closing means and the vessels of the reactor and allowing the elimination of the heat-insulation both at the level of the lower walls of the elements constituting the upper closing means for the vessel as well as at the level of the passages for the components such as rotating plugs, pumps or exchangers, such an elimination leading to a reduction in the diameters of the slab and vessel and consequently to a substantial reduction in the cost price of the reactor. The object of the operating temperature level according to the invention is also to allow integration of the flanges of the components in the structure of the upper closing means for the vessel.

To this end, according to the invention, a nuclear reactor is proposed, cooled by a liquid metal contained in a main vessel and topped by an atmosphere of neutral gas, said vessel being obturated by upper closing means comprising a slab and at least one rotating plug, these upper closing means comprising at least one circuit for circulation of a cooling fluid placed inside said closing means, wherein the cooling fluid is a gas, said circuit comprising a plurality of compartments defined by substantially radial vertical partitions, the gas passing, inside each compartment, through the thickness of said closing means from top to bottom, to penetrate in a supply manifold defined between the lower face of said closing means and a first substantially horizontal wall located above said lower face, the gas then passing, inside each compartment, through the thickness of said closing means again, from bottom to top, to penetrate in an evacuation manifold defined between the upper face of the closing means and a second substantially horizontal wall located therebeneath, so as to cool said closing means to a quasihomogeneous temperature and to maintain the surfaces dipped by the atmosphere of neutral gas at a temperature at least equal to 100° C., at nominal running of the reactor.

With respect to the reactors of the prior art, the rise in temperature of the upper closing means for the main vessel of the reactor leads to a substantial simplification of said reactor. In fact, it makes it possible to eliminate all heat insulation of the upper closing means for the vessel, both at the level of the horizontal surfaces (lower wall of the slab and of the rotating plugs) and at the level of the vertical surfaces (ferrules for passage of the components such as heat exchangers, pumps and rotating plugs). This elimination results in a considerable reduction in the cost of the reactor. Moreover, it simplifies and clears the heterogeneous welding of the top part of the stainless steel vessel with the slab made of black steel, this allowing a better control of this weld after it has been made an possibly allowing it to be inspected during service and even repaired by a robot.

Furthermore, the reduction of the diameter of the ferrules for passage of the components, resulting from the elimination of the heat insulation enables the diameter of the main vessel to be reduced. Moreover, as the temperature of the slab is closer to the temperature of the vessel than in the heretofore known solutions, the thermal stresses occurring during operation at the connection between the slab and the upper part of the vessel are substantially reduced. Similarly, the temperature difference between the gaseous layer and the closing structures being less, the activity of the thermosiphons of the gas in the annular spaces of the passages for the components and the thermal heterogeneities which they cause, are reduced. Finally, as has already been mentioned, the temperature of the slab and the rotating plugs enables the flanges for supporting the components to be integrated thereon. If all these elements are taken into account, it is seen that the present invention leads to a considerable saving and to an improved reliability with respect to heretofore known solutions.

According to the invention, the lower limit of 100° C. is determined experimentally by the temperature of solidification of the sodium condensates, i.e. the temperature for which the surfaces of the upper closing means in contact with the neutral gas (generaly argon) covering the liquid sodium are maintained above the temperature for which deposits of sodium risk being frozen. The highest temperature which may be attained is determined by the mechanical resistance of the connections, particularly with the infrastructure in normal operation of the reactor. Taking into account the possible developments of these connections, it is not possible to precise a higher limit temperature, even if it is difficult at present to exceed a temperature of 180° C.

According to a preferred embodiment of the invention, the upper closing means are cooled to a temperature chosen at about 120° C. for nominal running of the reactor, for which the vapour pressure of the sodium is important and where aerosols of sodium develop in the gaseous layer, which may condense on the upper closing means.

According to a first variant embodiment, the cooling gas may be constituted by atmospheric air taken from outside the reactor building overhanging said closing means possibly warming it circulating in the cooling circuit, filtering it and evacuating it outside the reactor building.

According to a second variant embodiment, the cooling gas is air taken from inside the reactor building overhanging said closing means, before possibly warming it, circulating it in the cooling circuit, cooling it, filtering it and evacuating it inside the reactor building.

Finally, according to a third variant embodiment of the invention, the cooling gas circulates in a closed circuit comprising the cooling circuit, at least one heat exchanger placed at the outlet of the latter, at least one means for circulating the gas and possibly a buffer tank. In this variant, a neutral gas compatible with sodium or, more easily, air, may be used for avoiding the hot reject in the reactor hall.

Inside each compartment, the first wall may present closely arranged openings and moreover define the upper face of a distribution vessel through which the gas penetrates, said openings defining discrete jets bringing the gas in direct contact with the lower face of the closing means. These distribution vessels may be supplied either through sectorized annular spaces defined on the outer periphery of the slab and the rotating plugs, or through vertical wells with integrated biological protection opening on the upper face of said closing means.

Gas may also be supplied to cyclones disposed in the supply manifold, so as to bring the gas in direct contact with the lower face of the closing means.

Each of the cyclones in then preferably supplied through a vertical well with integrated biological protection, opening on the upper face of said closing means.

According to another feature of the invention, inside each compartment, the supply manifold communicates with the evacuation manifold via at least one passage defined by a ferrule for passage of a component such as a heat exchanger, a pump or a rotating plug.

The invention will be more readily understood on reading the following description with reference to the accompanying drawings, in which.

Figure 1:
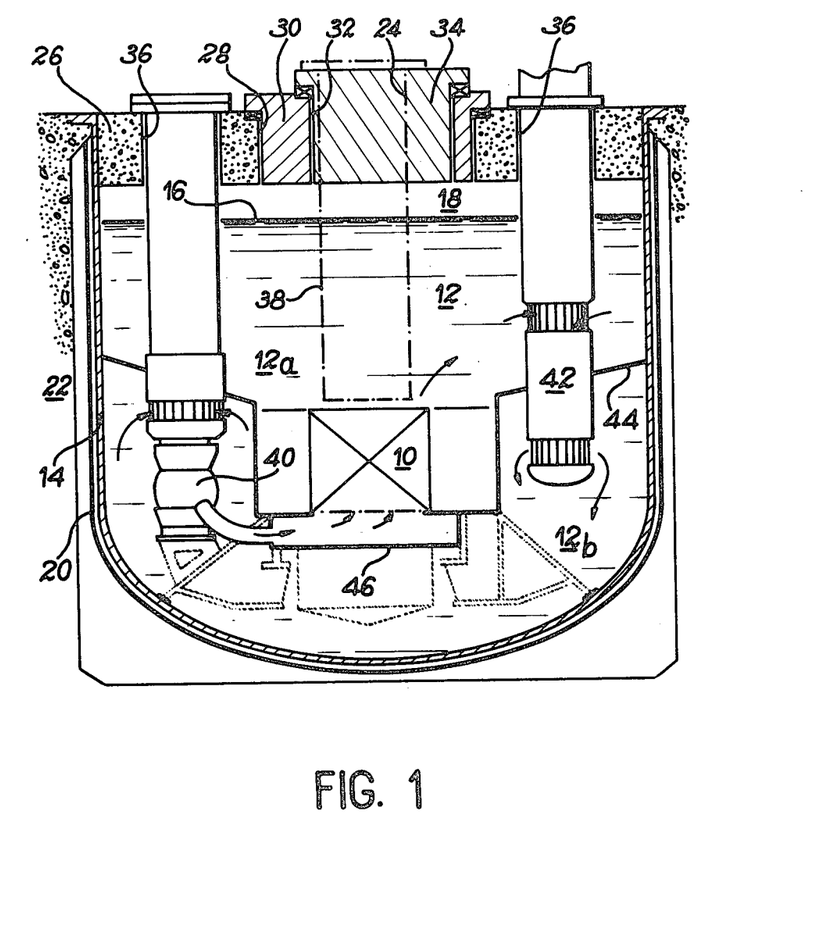
FIG. 1 is a schematic view, in axial section, of a fast neutron nuclear reactor according to the invention comprising cooled upper closing means.

Referring now to the drawings, the reference 10 in FIG. 1 designates the core of a fast neutron nuclear reactor, shown immersed in an appropriate mass of liquid metal 12, particularly sodium, intended to ensure cooling of the core during operation of the reactor. The liquid sodium 12 is confined in the main vessel 14 up to a level shown schematically at 16, the latter being topped by an atmosphere or layer 18 of a neutral gas, generally constituted by argon. The main vessel 14 is itself surrounded by a second vessel 20, called safety vessel, both of these two vessels having a common vertical axis and being disposed inside an outer protecting casing 22, generally called vessel well. The casing 22 supports in its upper part a closing slab 26. The latter extends horizontally above the level 16 of the liquid sodium in the vessel 14 and comprises a central opening 28 for positioning a large rotating plug 30 itself comprising an opening 32 for positioning a small rotating plug 34. According to a conventional assembly, the small rotating plug is eccentric with respect to the large rotating plug, so that these two plugs make it possible, by their mutual rotation, to serve the core 10 by means of an intervening tool, such as a bar (not shown in the Figure). The slab 26 also comprises other passages such as passages 36 for the assembly of apparatus necessary for the reactor to function, particularly for the circulation of the liquid sodium and for the extraction of the calories collected on passing through the core. These apparatus include in particular pumps of which one is schematically shown at 40 and heat exchangers of which one is schematically shown at 42. The small rotating plug 34 also comprises a passage 24 in which is received the plug of the core cover 38 carrying the absorbent rods ensuring fine control and shutdown of the reactor, as well as a certain number of measuring and control apparatus. An inner vessel 44 separates the liquid sodium 12 into a hot manifold 12a disposed above the core and a cold manifold 12b disposed below and on the periphery thereof. As indicated by the arrows in FIG. 1, the pumps 40 take the sodium from the cold manifold 12b and inject it via a diagrid 46 to the lower end of the core 10 of the reactor. The hot sodium leaving the core into the hot manifold 12a is conducted towards the exchangers 42 in which it loses part of its calories before being evacuated into the cold manifold 12b where it is taken up again by the pumps 40. The slab 26 and each of the rotating plugs 30 and 34 constitute the essential elements of what are generally called the upper closing elements of the main vessel 14.

During operation of the reactor, the upper closing means of the vessel 14 are cooled, according to the invention, to a sufficiently low temperature to eliminate any risk of cracks connected with the thermal stresses of the connections with the infrastructure and to a sufficiently high temperature for there to be no risk of a deposit of sodium being frozen on the lower faces and the passages in the slab and the rotating plugs which are directly in contact with the atmosphere of argon 18. The upper temperature limit depends on the design of the reactor and cannot be specified. On the contrary, the lower limit may be set approximately at 100° C. According to a preferred embodiment of the invention, this temperature is fixed at about 120° C. at nominal running of the reactor.

According to the invention, of which different variants are shown with reference to FIGS. 2 to 8, the cooling fluid circulates in spaces made in the upper closing means of the vessel. Moreover, this fluid is a gas which may be constituted, depending on the case, either by air, or by a refrigerated neutral gas such as nitrogen, helium or argon, this gas being used at a pressure close to atmospheric pressure.

Figure 2:
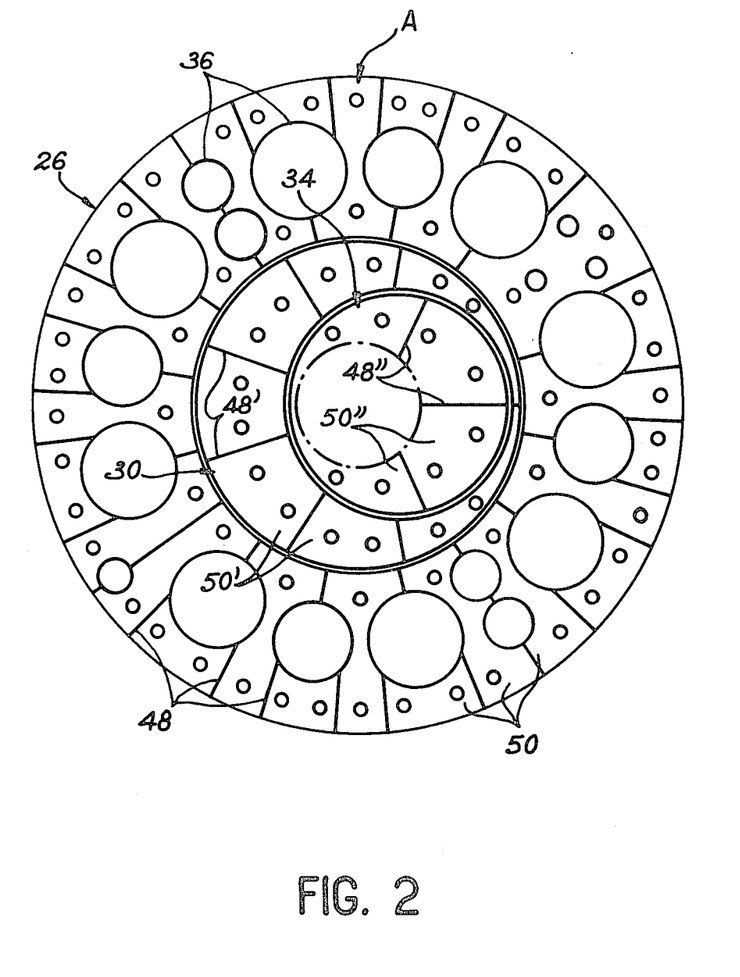
FIG. 2 is a plan view in section of the upper closing means of the reactor shown in FIG. 1, schematically illustrating the cooling of these closing means by means of a gas circulating in tight compartments.
Figure 3:
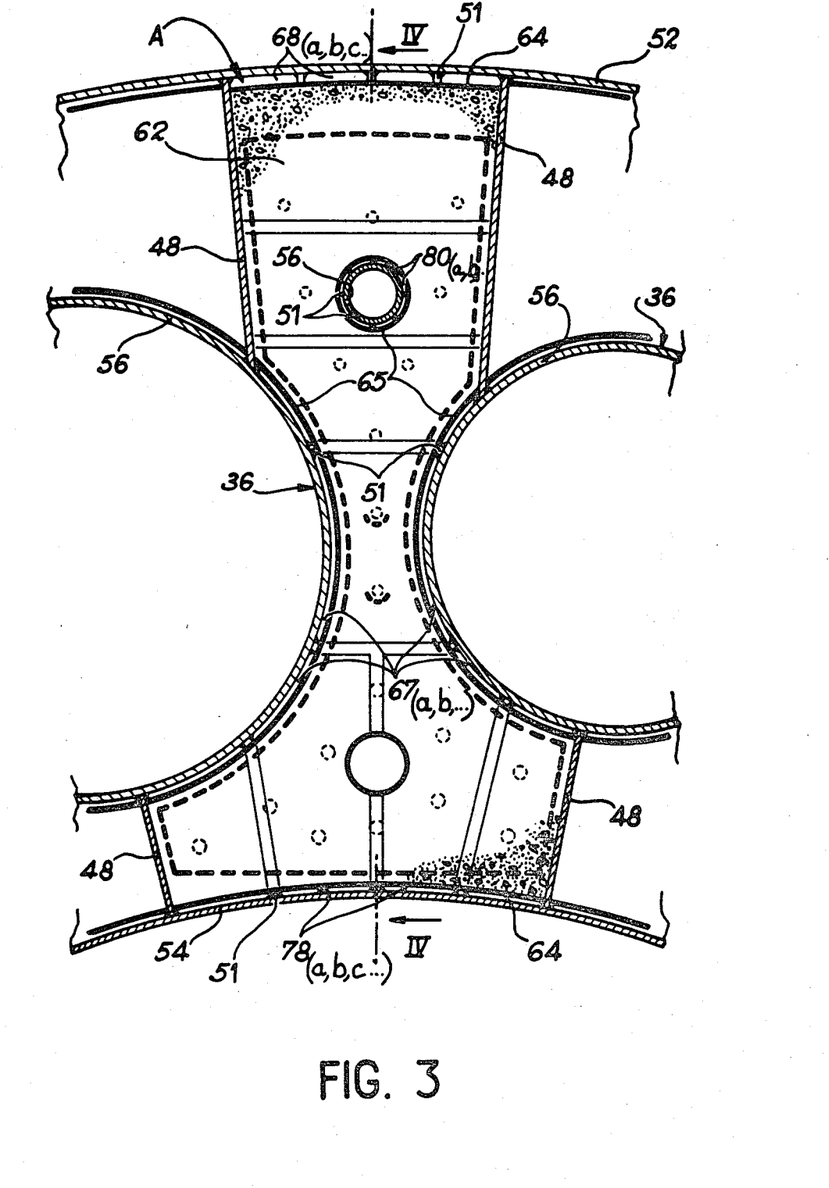
FIG. 3 is a view comparable to FIG. 2 illustrating to a larger scale the tight compartment of the slab designated by A in this Figure, this view corresponding to a section along line III—III of FIG. 4.
Figure 4:
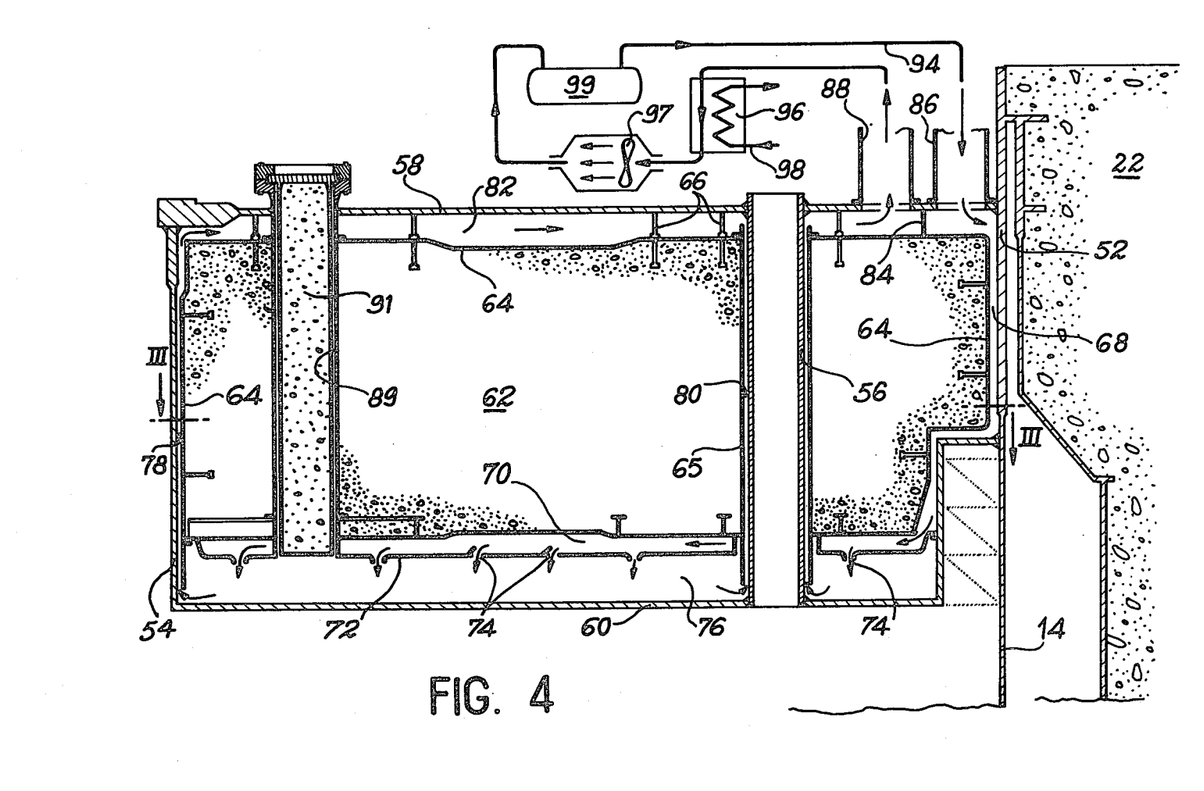
FIG. 4 is a view in vertical section along line IV—IV of FIG. 3, illustrating a variant embodiment according to which the gas circulates in a closed circuit and opens near the lower wall of the slab in the form of discrete jets.

FIGS. 2 to 4 in particular illustrate the subdivision of the slab and of each of the rotating plugs into tight compartments and the structure of one of these compartments showing the configuration of the cooling circuits defined by each of these compartments.

Thus, FIGS. 2 and 3 show that the slab 26 has a rigid outer structure, particularly of steel, containing a filling material 62 such as concrete, this structure being divided by vertical partitions 48 into a certain number of tight compartments 50. As will be seen hereinafter, each of the compartments 50 defines an independent cooling circuit in which the cooling gas circulates. More precisely, the partitions or stiffeners 48 extend in a substantially radial direction and are welded to the resistant ferrules 56 defining the passages 36 for the components as well as to the outer and inner ferrules 52 and 54, respectively, of the slab. Thus, the walls of each of the compartments 50 comprise rectilinear radial parts defined by the partitions 48, arcuate parts defined by the ferrules 56 and arcuate parts defined by the inner and outer ferrules 54 and 52 respectively, of the slab 26 (FIG. 3).

In comparable manner, in a variant embodiment shown in FIG. 2, the large rotating plug 30 and the small rotating plug 34 both have an outer structure made of steel containing filling concrete and divided into compartments 50' and 50'' by vertical partitions 48' and 48'' which extend substantially radially with respect to the axis of symmetry of the vessel. Each of the compartments 50' and 50'' then defines a cooling circuit in which the cooling gas circulates. In a variant (not shown), the partitions 48' and 48'' may be eliminated, with the result that each of the rotating plugs then defines a single compartment forming a cooling circuit in which the gas circulates.

FIG. 3 shows in section and to a larger scale one of the compartments 50 of the slab 26 marked by reference A in FIG. 2. This same compartment is shown in vertical section in FIG. 4.

FIGS. 3 and 4 show more precisely the rigid structure ensuring mechanical resistance of the slab and the concrete filling 62 serving for biological protection and locally for stiffening purposes for certain parts of the metallic structure. It is thus seen that the metallic structure is composed, in addition to the outer peripheral ferrule 52, the inner ferrule 54 and the ferrules 56, of an upper wall 58 and a lower wall or base 60, the radial partitions 48 dividing the inside of this metallic structure into a certain number of compartments 50, as has been seen.

As shown in particular in FIG. 4, the filling concrete 62 is arranged inside this structure so as to define therewith a cooling circuit in each of the compartments 50. To this end, the filling concrete 62 is confined in the metallic envelopes 64 and 65 welded to the partitions 48 and supported by tie rods 66 placed between the upper wall 58 and the upper wall of the envelope 64. The cooling circuit formed in each of the compartments 50 is defined by a succession of spaces formed between certain of the walls or of the ferrules of the metallic structure of the slab and the corresponding walls of the envelope 64. In this way, a first space 68 is defined between the outer ferrule 52 of the slab and the corresponding wall of the envelope 64. The spaces or passages 67, 68, 78 and 80, relative to each compartment 50 and defined between the ferrules 52, 54 of the slab, the ferrules 56 for passage of the components and the envelopes 64 and 65, are divided into sectors (68a, 68b, ...) by spacer elements 51 which allow a constant distance between the ferrules and the envelopes and which promote a uniform distribution of the cooling gas in the passages 67, 68, 78, 80. In the variant of FIG. 4, the gas, arriving through orifice 86, penetrates in the passage 68 which communicates by its lower part with a distribution vessel 70 defined between the lower face of the envelope 64 and a wall 72 located opposite the lower wall 60 of the slab. The wall 72 is perforated with a large number of openings or holes 74, which are arranged relatively closely to one another, through which the cooling gas admitted into the vessel 70 escapes in the form of discrete jets. The gas then penetrates in a supply manifold 76 defined between the partition 72 and the lower wall 60, so as to lick the latter in direct contact to ensure cooling thereof. The cooling gas then rises towards the upper part of the slab simultaneously through sectorised spaces such as 78a, 78b, ... defined between the inner ferrule 54 of the slab and the corresponding wall of the envelope 64, and through sectorised spaces 80a,80b, . . . defined between the ferrule 56 ensuring passage of a component and the corresponding wall of the envelope 65. Each of the sectorised spaces 78 and 80 communicates with an evacuation manifold 82 defined between the upper wall 58 of the slab and the corresponding partition of the envelope 64, so that this space 82 serves as manifold for the cooling gas and allows the upper wall 58 to heat in order to homogenise the temperature of the structures. A vertical partition 84 sealingly separates the "cold" cooling gas admitted through the inlet orifice 86 in the space 68 from the "hot" cooling gas evacuated from the space 82 through the outlet orifice 88. The orifices 86 and 88 have been shown by way of example, for a slab 26 suspended from the infrastructure 22 as being located on the upper wall 58 of the slab, but it will be understood that they may possibly be placed on the outer ferrule 52 for different solutions for supporting the slab.

FIG. 4 shows that a shaft 89 may place the manifold 76 in communication with the top of the slab, this shaft being normally obturated by a plug 91 filled with concrete. Such a shaft makes it possible, in particular, to make any necessary inspections of the lower wall 60 during operation, as well as of the base of the ferrules 56 in the slab.

If necessary, it can also ensure emergency cooling by natural convection or by external forced circulation in the event of breakdown of the means for circulating the gas.

Figure 5:
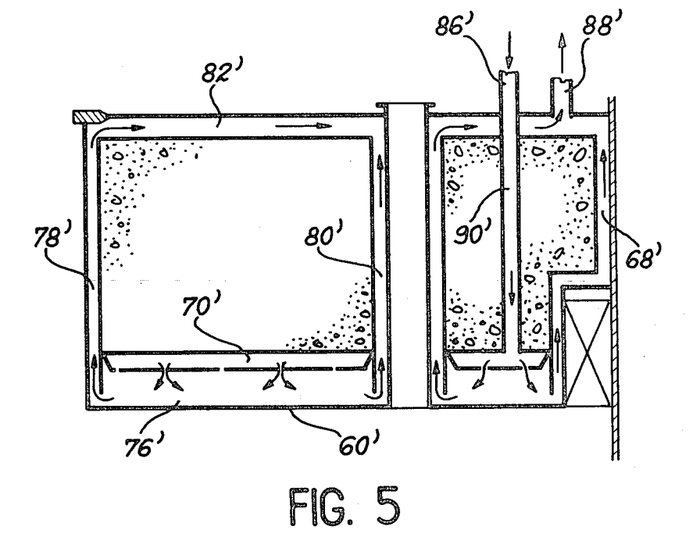
FIGS. 5 and 6 are views in schematic section comparable to FIG. 4 illustrating two variant embodiments, in which the cooling circuit is slightly modified with respect to the variant of FIG. 4.
Figure 6:
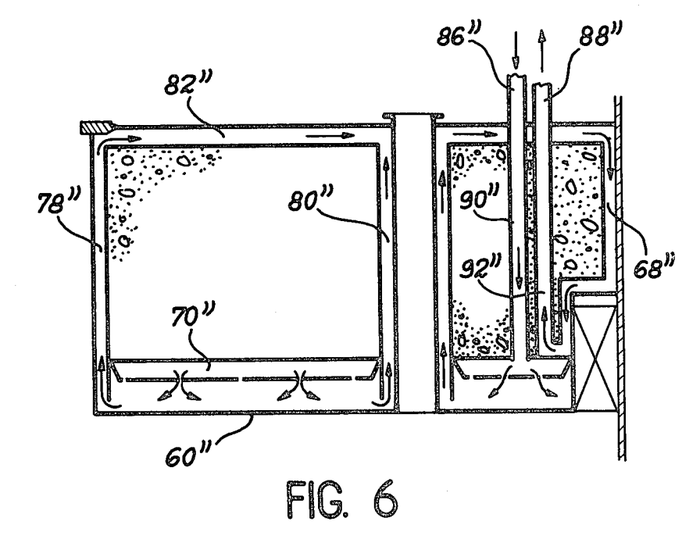

FIGS. 5 and 6 show by way of non-limiting example two variant embodiments of the cooling circuit of the compartment designated by reference A in FIG. 2.

In FIG. 5, the inlet orifice 86' is extended by at least one vertical well 90' which opens directly in the distribution vessel 70'. Moreover, the gas having served for cooling the lower wall 60' is returned from manifold 76' towards manifold 82' simultaneously through each of the spaces 78', 80' and 68'. Due to the direct admission of the cooling gas in the vessel 70' through well 90' and to the return of this gas towards the outlet orifice 88' through spaces 68', 78' and 80', the partition 84 of the variant of FIG. 4 need no longer exist and may be eliminated. This variant differs essentially from the variant of FIG. 4 in that the wells 90' may act as shaft (for natural convection) in the event of breakdown of the means normally controlling the circulation of the gas (fans 97 in FIG. 4).

In the variant embodiment of FIG. 6, the admission of gas in the vessel 70" is effected as in the variant of FIG. 5 through at least one well 90" which communicates directly with the inlet orifice 86". However, instead of communicating directly with the manifold 82" as in the variants of FIGS. 4 and 5, the outlet orifice 88" is connected by at least one well 92" to the lower part of the space 68", so that the gas having served for cooling the lower wall 60" rises through the spaces 78" and 80" up to manifold 82, then redescends through the space 68" before rising through the well 92" towards the outlet orifice 88". The use of wells 90" and 92" further improves natural convection and therefore functioning in the event of breakdown of the means for circulating the cooling gas, compared with the variant of FIG. 5.

In other respects, the embodiments of FIGS. 5 and 6 can be correctly adapted to cooling of the rotating plugs, during handling of the reactor, by means of a circuit opened in the reactor hall, air being moved by fans carried by the rotating plugs and exhausted in the hall through a mixer, the heat flow to be evacuated being substantially lower than under nominal conditions.

In the three variant embodiments which have just been described, it will be noted that the cooling gas is conducted quickly towards the lower wall of the slab so that cooling thereof is given priority. This cooling, which is effected by means of discrete jets formed from the openings 74 defined in the lower partition 72 of the distribution vessel 70, precedes the simultaneous rise of the cooling gas along the ferrules 56 for passage of the components and along the inner ferrule 54 for passage of the large rotating plug. Preferentially, under nominal working conditions, the outer ferrule is cooled at first.

Of course, a cooling circuit of this type may be defined in each of the compartments 50 defined by the partitions 48 inside the slab and in each of the compartments 50' and 50" defined by the partitions 48' and 48" inside the large rotating plug 30 and the small rotating plug 34.

If it is desired to produce a structure enabling the upper closing means of the vessel to be walked on, it is necessary to cover the upper wall with a heat-insulator protected by a duckboard flooring or to place complementary biological protection means beneath the flooring, due to the relatively high temperature of these closing means. However, this heat insulator is of conventional type (glass wool for example) and has nothing to do with the particularly expensive metallic heat-insulation in argon-sodium medium which, according to the prior art, must be placed beneath the lower wall and in the ferrules.

According to another aspect of the invention, the circulation of the cooling gas in each of these circuits may be effected in different manners.

In a variant embodiment (not described), this circulation may be made in an open circuit, the cooling gas then being atmospheric air. This cooling air may either be taken from outside the reactor building (not shown) overhanging the upper closing means of the main vessel, or directly from inside this building. In both cases, means such as fans enable the air to be conducted up to the inlet orifices 86 of each of the circuits.

It may also be envisaged to circulate the cooling gas in one or more closed circuits containing the cooling circuits defined in each of compartments 50, 50' and 50". This solution is shown schematically in FIG. 4. In fact, this Figure shows that the cooling circuit defined in compartment A shown is placed in a closed circuit 94 which further comprises, between the outlet orifice 88 and the inlet orifice 86, an exchanger 96 ensuring cooling of the gas by means of a cooling circuit 98, a fan 97 and possibly a buffer tank 99 in the case of a neutral gas being used. Of course, such a circuit may group in parallel several and even all the cooling circuits defined in the slab and in the rotating plugs.

Figure 7:
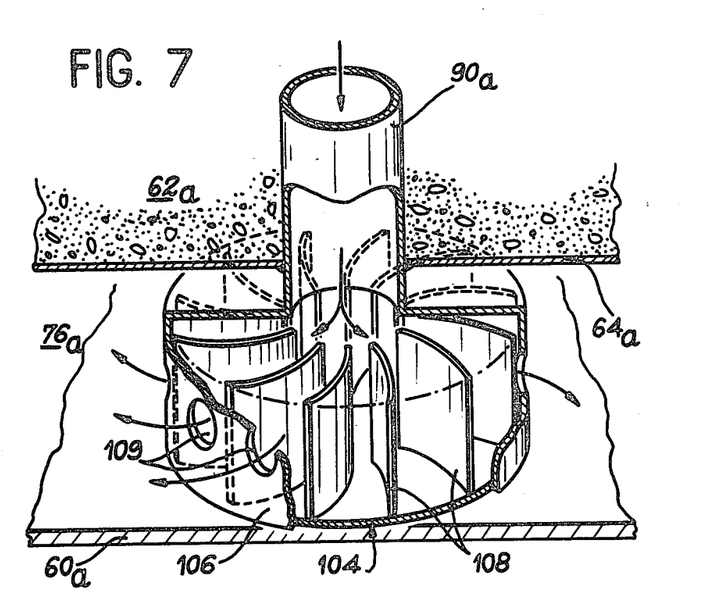
FIG. 7 is an exploded perspective view illustrating another variant embodiment, according to which the cooling gas is brought into direct contact with the lower wall of the slab through vertical wells communicating with cyclones.

FIG. 7 shows a variant of the cooling means for the lower wall 60a of the slab, in which the formation of discrete jets by means of openings formed in the lower partition of a distribution vessel is replaced by the formation of eddies of gas by means cyclones 104, relatively few in number, distributed regularly inside the manifold 76a defined between the wall 60a and the corresponding wall of the envelope 64a. More precisely, each of the cyclones 104 is supplied with gas through vertical wells 90a which pass through the filling concrete 62a to open, each in a cyclone 104. Each cyclone 104 is composed of a cylindrical box 106 whose vertical axis is merged with that of the corresponding well 90a. Each of the wells 90a opens in a cylcone 104 and the latter presents a certain number of fins 108 which are disposed substantially radially inside the box 106. The fins 108 have a curved shape, giving the cooling gas arriving at their centre through well 90a a vortical movement. Openings 109, which are circular in the variant shown, are formed in the peripheral partition of the box 106 to allow the cooling gas to penetrate in the manifold 76a and the lick, in direct contact, the lower wall 60a to ensure cooling thereof.

In all the variants which have just been described of the circuit for cooling by gas defined in each of the compartments 50, it will be noted that the gas comes into direct contact with each of the walls to be cooled, i.e. mainly with the lower wall 60, the ferrules 56, 54 and 52 and the upper wall 58. The temperature thus obtained being chosen according to the invention to be higher than 100° C., no frozen deposit of sodium on the lower face of the wall 60 or on the inner faces of the ferrules 56 and 54 is produced. It is thus possible to eliminate any heat-insulation at this level, this leading to an appreciable saving taking into account the cost of the metallic heat-insulator which must be used in the nuclear reactors of the prior art whose slab is cooled to a temperature close to 50° C.

Of course, the temperatures reached due to the cooling circuits which have just been described depend both on the nature of the gas used, the temperature at which this gas is injected in the cooling circuits and on the mean rate of flow of this gas. By way of indication, in the case of air being used for cooling the upper closing means to a average quasi-homogeneous temperature of 120° C., the total power to be evacuated under nominal conditions being 950 kW, the air will enter the cooling circuits at a temperature of about 85° C. to leave at a temperature of about 115° C., the mean rate of flow being 30 m³/s.

Figure 8:
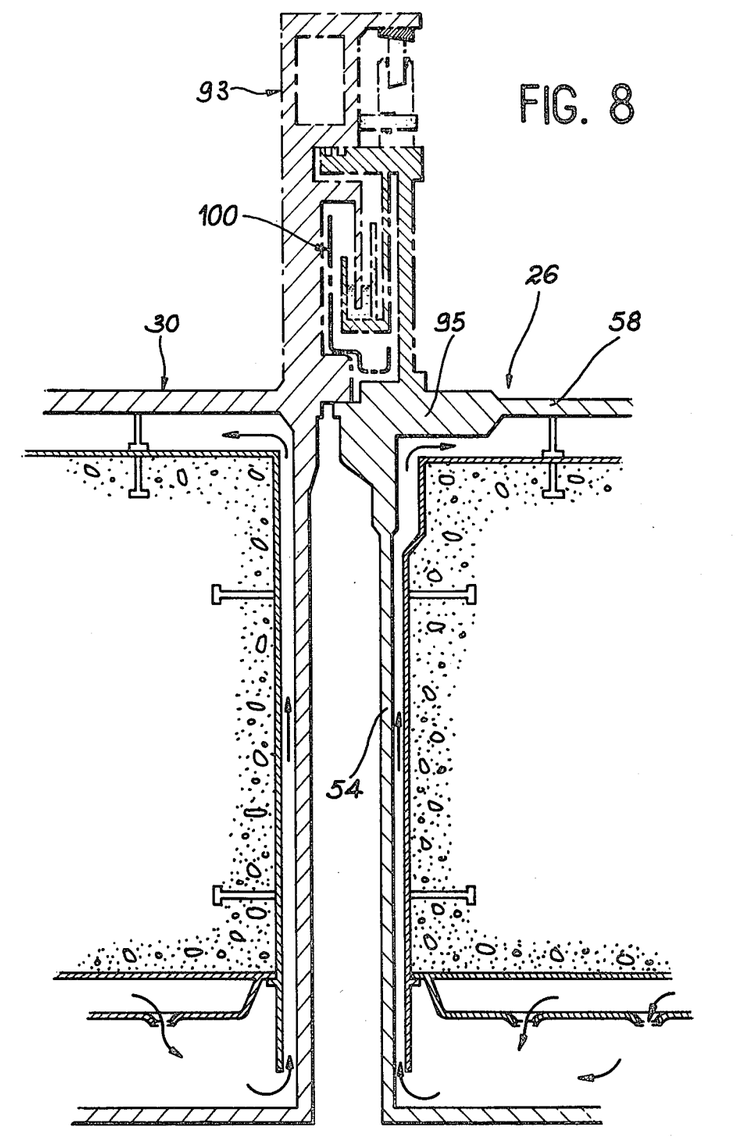
FIG. 8 is a view in vertical section showing the integration of the flange for supporting the large rotating plug in the slab.

As illustrated in particular in FIG. 8, the maintaining of the upper closing means of the main vessel at a temperature higher than the temperature for which frozen deposits of sodium risk being produced on the surfaces dipped by the atmosphere of neutral gas loaded with vapors and aerosols of sodium of the slab and the rotating plugs, makes it possible to integrate in the metallic structure of each of its elements certain of the flanges for supporting the rotating plugs and the other components such as pumps, leading to a reduction in weight of the material used and in axial dimensions. In fact, it is known that these supporting flanges must be taken to a temperature preventing any frozen deposit of sodium, which prevented them from being integrated in the structure of the slab when the latter was cooled to a temperature of about 50° C. in accordance with the prior art, due to the thermal stresses which would have resulted therefrom. FIG. 8 shows that the support flange 95 for the large rotating plug 30 is integral both with the upper wall 58 of the slab and with the inner ferrule 54 thereof. All the means 93 for supporting, guiding and rotating the rotating plug 30 with respect to the slab 26, as well as the seal means 100 which are associated therewith are, furthermore, identical to the known means of the prior art and will not be described here in detail.

Of course, the present invention is not limited by the variant embodiments which have just been described.

It is applicable both to fast neutron reactors cooled by liquid metal of the "loop reactor" type and to fast reactors of the "integrated" type illustrated in the accompanying drawings of the present invention.

What is claimed is:

1. In a nuclear reactor cooled by a liquid metal contained in a main vessel with a vertical axis and topped by an atmosphere of neutral gas, said vessel being obturated by horizontal upper closing means comprising a slab and at least one rotating plug, said upper closing means comprising at least one circuit for circulation of a cooling fluid placed inside said closing means, the cooling fluid being a gas, said circuit comprising a plurality of compartments defined by substantially radial vertical partitions, the gas passing, inside each compartment, through the thickness of said closing means from top to bottom, to penetrate in a supply manifold defined between substantially the complete lower face of said closing means corresponding to said compartment and a first substantially horizontal wall located thereabove, the gas then passing, inside each compartment, through the thickness of said closing means again, from bottom to top, to penetrate in an evacuation manifold defined between substantially the complete upper face of the closing means corresponding to said compartment and a second substantially horizontal wall located thereebeneath, so as to cool said closing means to a quasi-homogeneous temperature and to maintain the surfaces dipped by the atmosphere of neutral gas at a temperature greater than 100° C., at nominal running of the reactor.

2. The nuclear reactor of claim 1, wherein, inside each compartment, the first wall presents closely arranged openings and moreover defines the lower face of a distribution vessel through which the gas penetrates, said openings defining discrete jets bringing the gas in direct contact with the lower face of the closing means.

3. The nuclear reactor of claim 2, wherein sectorized annular spaces for supplying gas are defined on the outer periphery of the slab and the rotating plug, and open in the distribution vessels.

4. The nuclear reactor of claim 2, wherein vertical wells for supplying gas open on the upper face of said closing means and in the distribution vessels.

5. The nuclear reactor of claim 1, wherein cyclones for supplying gas are disposed in the supply manifold so as to bring the gas in direct contact with the lower face of the closing means.

6. The nuclear reactor of claim 5, wherein each of the cyclones communicates with a vertical supply well opening on the upper face of said closing means.

7. The nuclear reactor of any one of claims 1 to 6, wherein, inside each compartment, the supply manifold communicates with the evacuation manifold via at least one passage defined by a ferrule for passage of a component such as a heat exchanger, a pump or a rotating plug.

8. The nuclear reactor of any one of claims 1 to 6, wherein the slab comprises shafts, normally obturated by plugs, which may place the supply manifold in communication with the top of the slab, and which allows inspections to be made of the lower wall and of the bases of the ferrules during service, and part of the residual energy to be evacuated, by forced circulation or natural convection, in the case of breakdown of the active systems for circulation of the cooling fluid.

9. The nuclear reactor of any one of claims 1 to 6, wherein the cooling gas is atmospheric air taken from outside the reactor building overhanging said closing means, before possibly warming it, circulating it in said cooling circuit, filtering it and evacuating it outside the reactor building.

10. The nuclear reactor of any one of claims 1 to 6, wherein the cooling gas is air taken from the reactor building overhanging said closing means, before possibly warming it, circulating it in said cooling circuit, cooling it, filtering it and evacuating it inside the reactor building.

11. The nuclear reactor of any one of claims 1 to 6, wherein the cooling gas circulates in a closed circuit comprising said cooling circuit, at least one heat exchanger placed at the outlet of the latter and at least one means for circulating the gas.

* * * * *